United States Patent [19]  [11] 3,715,261
Hennig et al.  [45] Feb. 6, 1973

[54] APPARATUS FOR OPENING AND MARKING THE CONTENTS OF FILM CASSETTES

[75] Inventors: Fridolin Hennig; Hans-Jurgen Kellner; Klaus Potz; Christian Gotze, all of Munich, Germany

[73] Assignee: Agfa-Gevaert Aktiengesellschaft, Leverkusen, Germany

[22] Filed: Jan. 29, 1971

[21] Appl. No.: 111,032

Related U.S. Application Data

[62] Division of Ser. No. 792,288, Jan. 21, 1969, Pat. No. 3,580,443.

[30] Foreign Application Priority Data

Jan. 19, 1968 Germany.....................P 16 22 303.3
Sept. 14, 1968 Germany.....................P 17 97 336.3

[52] U.S. Cl. .....................156/552, 156/505, 225/95
[51] Int. Cl. .........................B32b 31/10, B32b 31/20
[58] Field of Search..............156/502, 505, 506, 517; 225/93, 95

[56] References Cited

UNITED STATES PATENTS 3,265,263   8/1966   Lafontant et al. ..................225/95 X
3,411,682   11/1968  Leader et al. .........................225/93
2,794,489   6/1957   Drummond ..........................156/505
2,099,439   11/1937  Goldhammer....................156/502 X

*Primary Examiner*—Benjamin A. Borchelt
*Assistant Examiner*—James M. Hanley
*Attorney*—Michael S. Striker

[57] ABSTRACT

Apparatus for opening plastic housings of film cassettes has a support which can hold a housing in a predetermined position, a tool having a cutting edge which is movable against and penetrates into the housing to produce therein a crack, a mechanism for thereupon moving the tool with reference to the housing or vice versa so that the crack is propagated until the housing is sufficiently opened to permit withdrawal of the reel which carries exposed film, and an applicator for applying an identifying marker to a predetermined portion of film on the withdrawn reel.

6 Claims, 10 Drawing Figures

INVENTOR
FRIDOLIN HENNIG
HANS-JÜRGEN KELLNER
KLAUS PÖTZ
CHRISTIAN GÖTZE

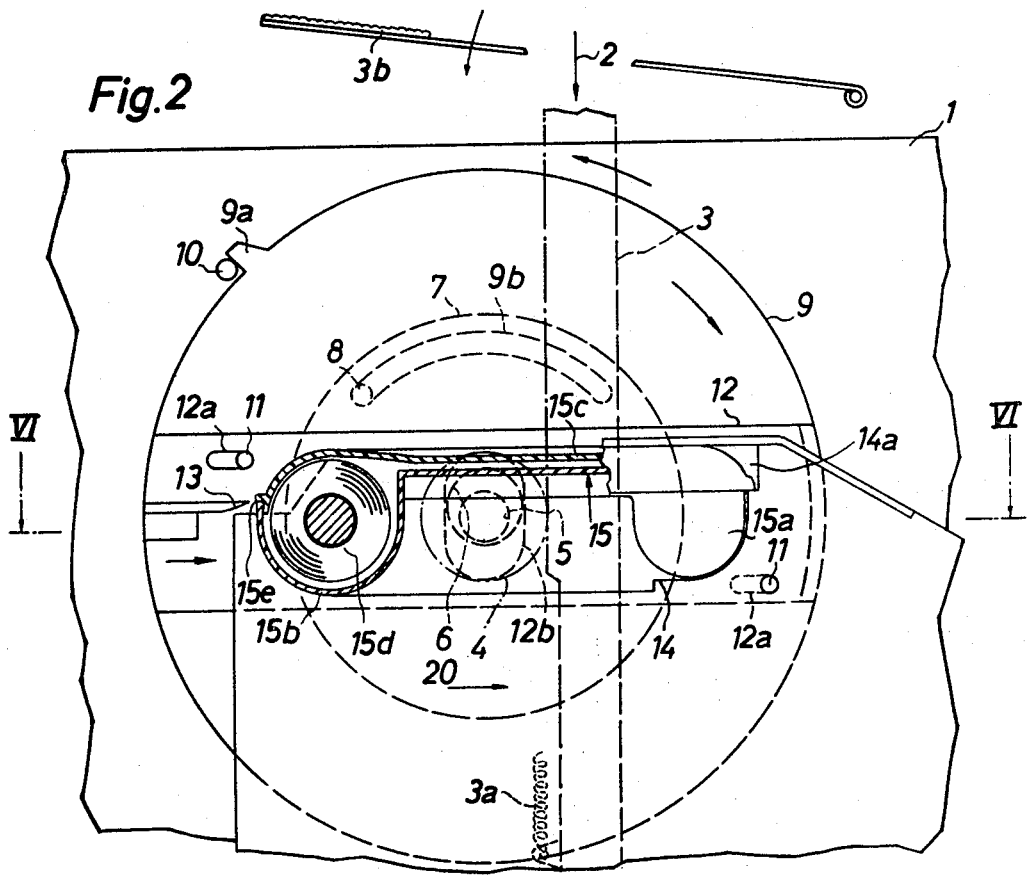

INVENTOR
FRIDOLIN HENNIG
HANS-JÜRGEN KELLNER
KLAUS PÖTZ
CHRISTIAN GÖTZE

Fig. 7
Fig. 8
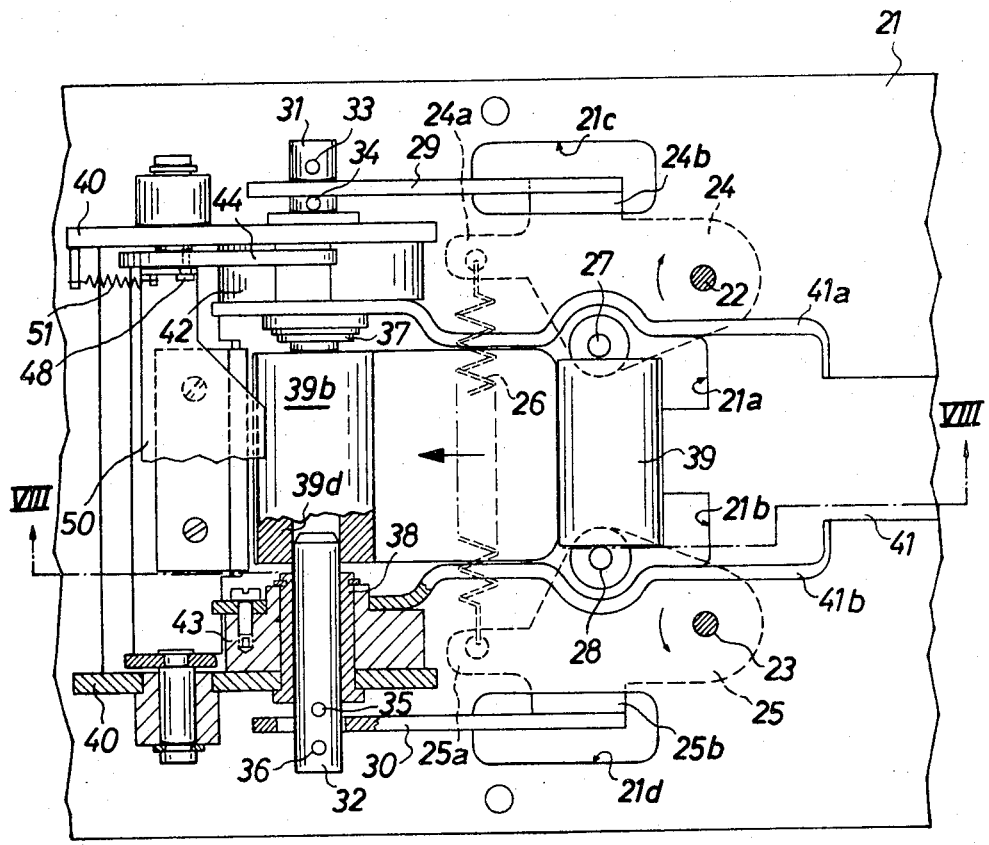
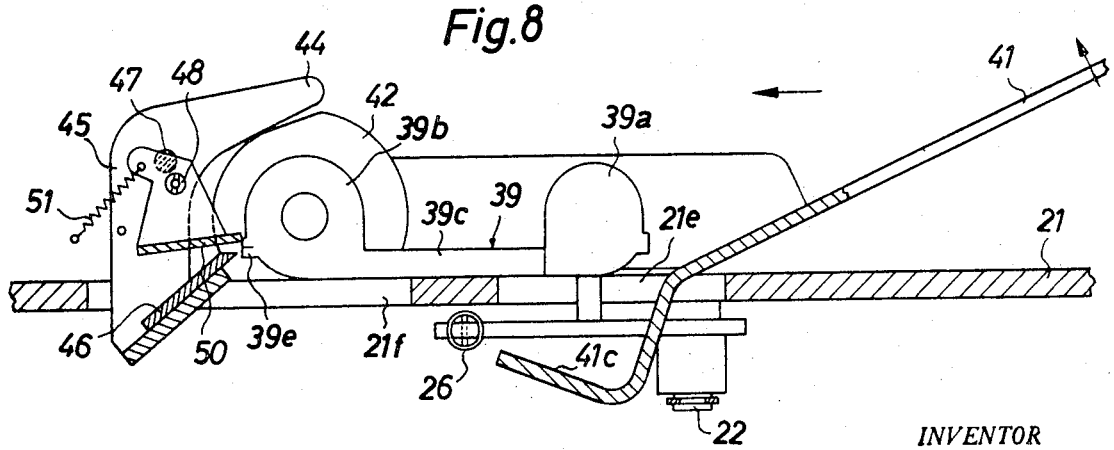

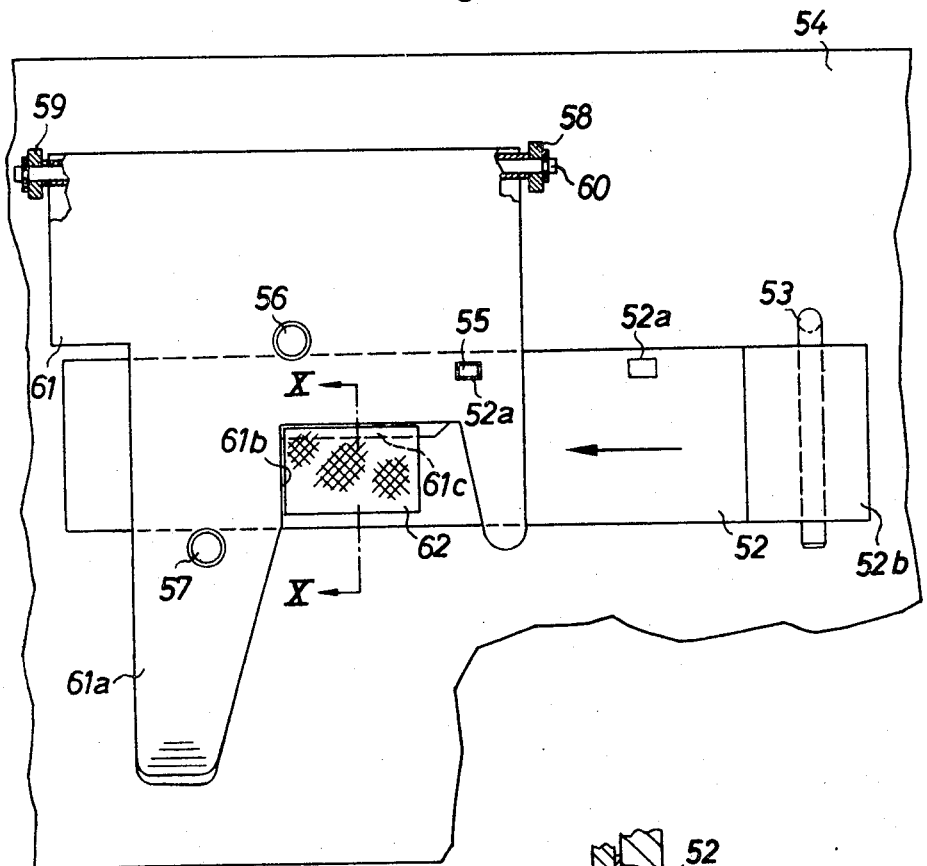

APPARATUS FOR OPENING AND MARKING THE CONTENTS OF FILM CASSETTES

CROSS-REFERENCE TO RELATED APPLICATION

This application is a division of our copending application Ser. No. 792,288 filed Jan. 21, 1969, now U.S. Pat. No. 3,580,443.

BACKGROUND OF THE INVENTION

The present invention relates to apparatus for treating magazines or cassettes which contain roll film, and more particularly to improvements in apparatus for opening and identifying or marking the contents of disposable cassettes for exposed film. Still more particularly, the invention relates to apparatus which are especially suited for opening plastic housings of cassettes wherein a supply portion of the housing is connected with a takeup portion by a hollow intermediate part. Such cassettes are known as "Filmpaks" and are used in many recent types of still cameras.

British patent No. 1,041,171 discloses a cassette opening device wherein the cassette is mounted on a spindle and is thereupon subjected to deforming stresses until its housing breaks sufficiently to permit removal of the film-carrying reel. The patented device is designed to break the housing into two halves which fall away from the reel. A drawback of such proposal is that the plastic housing is likely to splinter whereby fragments of plastic material can damage the exposed film. Another drawback of such proposal is that there is no provision for the application of identifying tabs to the films which are accessible upon destruction of the housing. Such tabs are normally provided with numbers which identify the customers and must be transferred from the plastic housing onto the film to avoid mixups when the prints are to be shipped back to customers.

SUMMARY OF THE INVENTION

An object of the invention is to provide an apparatus which can properly retain the film-supporting reel subsequent to opening of the housing of the cassette so that the film can be readily marked, detached from the reel and/or spliced to a preceding film prior to transport through a developing or other film processing machine.

An additional object of the invention is to provide an opening apparatus which is constructed in such a way that the operator can readily locate, remove and transfer the identifying tab from the housing to the film which becomes accessible upon opening of the housing.

Still another object of the invention is to provide a device which can be used conjointly with the improved opening apparatus or with other types of opening apparatus to permit accurate application of identifying tabs to leading ends of films which become accessible upon opening of housings of the respective cassettes.

The improved apparatus is particularly suited for opening of cassettes of the type having a plastic housing including takeup and supply portions connected by an intermediate part and wherein one of the portions contains a reel with convoluted exposed film which must be removed for introduction into a developing machine. The apparatus comprises support means for supporting the housing of a cassette in a predetermined position, and opening means comprising a movable tool having a cutting portion (e.g., the cutting edge of a chisel) and actuating means operative to effect relative movement between the tool and the support means so that the cutting portion of the tool penetrates into and produces at least a crack in the housing which is held in predetermined position. The actuating means further comprises means for moving the tool with reference to the thus cracked housing and/or vice versa so that the cutting edge remains in engagement with the housing and causes propagation of the crack until the housing is broken sufficiently to permit removal of or access to the reel therein.

The cutting portion of the tool can be rotated with reference to the housing about a fixed axis subsequent to partial penetration into the housing, or the housing can be pivoted by an actuating member about the axis of its reel while the housing is engaged by the cutting portion.

The apparatus further comprises or is combined with or used in conjunction with an applicator which can insure attachment of customary adhesive-coated markers or tabs with customer numbers to predetermined portions of successively removed films.

The novel features which are considered as characteristic of the invention are set forth in particular in the appended claims. The improved opening and identifying apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary front elevational view of the apparatus in starting position;

FIG. 7 is a fragmentary top plan view of a second opening apparatus, with certain parts shown in section;

FIG. 8 is a longitudinal vertical sectional view as seen in the direction of arrows from the line VIII—VIII of FIG. 7;

FIG. 9 is a fragmentary top plan view of an applicator which can be used to attach identifying tabs to predetermined portions of successive exposed films; and FIG. 10 is a fragmentary transverse vertical sectional view as seen in the direction of arrows from the line X—X of FIG. 9.

DESCRIPTION OF THE PREFERRED EMBODIMENTS

Figure 1:
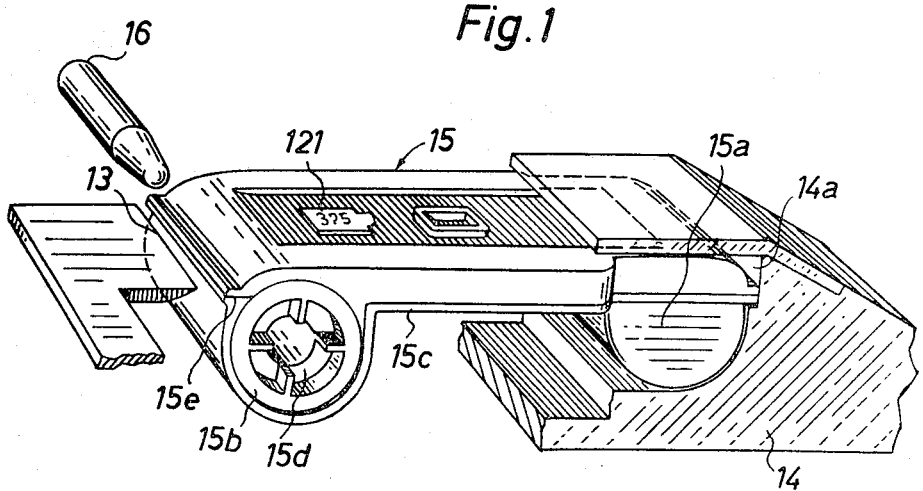
FIG. 1 is a fragmentary perspective view of a portion of a first opening apparatus showing the housing of a cassette in a predetermined position prior to cracking.
Figure 6:
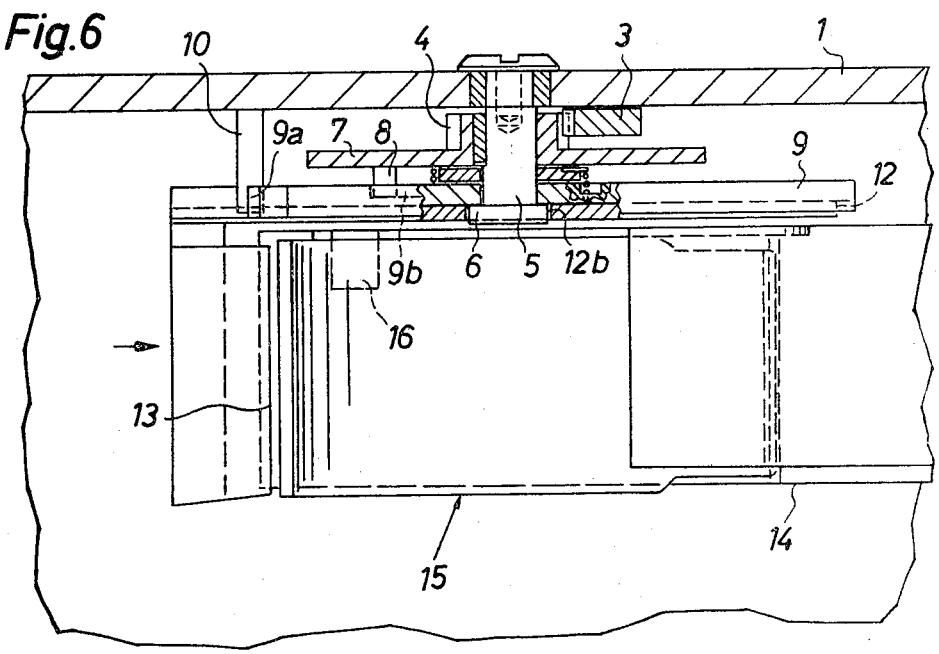
FIG. 6 is a horizontal sectional view substantially as seen in the direction of arrows from the line VI—VI of FIG. 2.

Referring first to FIGS. 1 to 6, there is shown an apparatus for opening film cassettes 15 of the type known as "Filmpaks." As best shown in FIG. 1, the housing of the cassette 15 comprises a supply portion 15a, a takeup portion 15b and a hollow intermediate part or web 15c. FIGS. 2 and 6 show that the apparatus comprises a frame including an upright wall 1 which supports a vertically reciprocable toothed rack 3 forming part of a manually or motorically operated drive of the opening means in our apparatus. The direction in which the rack 3 must be moved against the opposition of a return spring 3a is indicated by arrow 2. For example, the rack 3 can be moved downwardly, as viewed in FIG. 2, by hand, by a foot pedal 3b, or by another suitable operator-controlled member. The teeth of the rack 3 mesh with the teeth of a pinion 4 which is rotatable about the axis of a horizontal shaft 5 journalled in the wall 1. The shaft 5 is provided with an eccentric 6 which shares rotary movements of the pinion 4. The latter is rigid or integral with a disk-shaped driving member 7 which is provided with an eccentric pin 8. The shaft 5 further carries a large disk-shaped holder or wheel 9 which is rotatable thereon and has a radial projection 9a which normally abuts against a stop 10 on the wall 1 under the action of return spring 3a. The holder or wheel 9 is further provided with an arcuate slot 9b whose center of curvature is located on the axis of the shaft 5 and which accommodates the eccentric pin 8 of the disk 7. The slot 9b extends along an arc of substantially 90°.

The wheel 9 serves as a holder for a diametrically extending reciprocable slide or carriage 12 having longitudinally extending slots 12a for guide pins 11 of the wheel 9. The central portion of the carriage 12 has a transversely extending slot 12b for the eccentric 6 of the shaft 5. The left-hand end portion of the carriage 12 is provided with or attached to a movable cassette opening tool here shown as a chisel 13.

A support 14 in the form of a table or platform is installed in the frame of the opening apparatus in front of the wall 1 and is preferably adjustable up and down and/or sideways with reference to the remainder of the frame. This platform 14 serves to support a cassette 15 in a predetermined position and is provided with a recess 14a (see particularly FIG. 1) which can accommodate the portion 15a of a cassette 15 so that the latter is located in front of the carriage 12. The recess 14a accommodates the supply portion 15a of the cassette 15 in such a way that the latter cannot turn in the platform 14 in a clockwise direction, as viewed in FIG. 2. The platform 14 or the wall 1 is further provided with an axially movable spindle 16 (FIG. 1) which can enter the central bore of the reel 15d in the takeup portion 15b of a properly installed cassette 15. The housing of the cassette 15 consists of synthetic plastic material and its parts are united along a welded seam 15e which extends transversely of the housing and is adjacent to the reel 15d. When the spindle 16 extends into the bore of the reel 15d, the seam 15e is in registry with the cutting edge of the chisel 13.

The operation:

The supply portion 15a of the housing of a cassette 15 is inserted into the recess 14a of the platform 14 when the rack 3 assumes its upper end position so that the projection 9a of the holder or wheel 9 bears against the stop 10 and the eccentric pin 8 is located at the left-hand end of the slot 9b (FIG. 2). The chisel 13 is then spaced from the seam 15e so that it does not interfere with insertion of the cassette. The operator thereupon depresses the pedal 3b to move the rack 3 in the direction indicated by arrow 2 and to rotate the shaft 5 by way of the pinion 4. The eccentric 6 causes the carriage 12 to move in a direction to the right, as viewed in FIG. 2 (see the arrow 20), and to assume the position shown in FIG. 3 whereby the cutting edge of the chisel 13 penetrates into the seam 15e and cracks the housing of the cassette 15 along the same. During such rightward movement of the carriage 12, the pin 8 of the driving disk 7 travels along and toward the right-hand end of the slot 9b while the wheel 9 remains at a standstill. The operator continues to depress the pedal 3b so that the pin 8 begins to rotate the wheel 9 about the axis of the shaft 5 in a clockwise direction, as viewed in FIG. 3, and to the position shown in FIG. 4. The wheel 9 rotates the carriage 12 which causes its chisel 13 to break open the housing of the cassette 15 by causing the crack in the seam 15e to propagate itself in the intermediate part 15c toward the supply portion 15a (see FIGS. 4 and 5). The housing of the cassette 15 can crack at another point when the chisel 13 moves from the position of FIG. 3 to that shown in FIG. 4.

The operator then releases the pedal 3b so that the spring 3a contracts and returns the rack 3 to the starting position shown in FIG. 2. The fractured housing of the cassette 15 is then withdrawn from the platform 14 and is opened all the way by hand so that the operator gains access to the reel 15d. Also, the operator detaches the adhesive-coated identifying tab or marker 121 (FIG. 1) which is applied to the intermediate part 15c upon receipt of the cassette from the customer and the operator transfers the thus detached tab 121 onto the leading end of exposed but undeveloped film which is convoluted on the core of the reel 15d. The exposed film is then ready for introduction into an automatic developing machine which is not shown in the drawing.

An important advantage of the chisel 13 and wheel 9 is that the chisel cracks the housing of a cassette 15 along the seam 15e and that the wheel 9 thereupon causes the chisel to enlarge the crack in the housing of the cassette, starting from the crack in the seam 15e. This insures that the housing is opened without fragmentizing. Fragments of plastic material which are broken off the housing of a cassette in conventional opening apparatus are likely to damage the film. Another advantage of the just described apparatus is that the reel 15d need not fall out of the opened housing of the cassette 15 so that the operator can transfer the tab 121 onto the reel 15d after the latter is manually removed from the broken housing. It is clear that the apparatus of FIGS. 1 to 6 can be designed for opening of cassettes or magazines which contain motion picture film.

Figure 3:
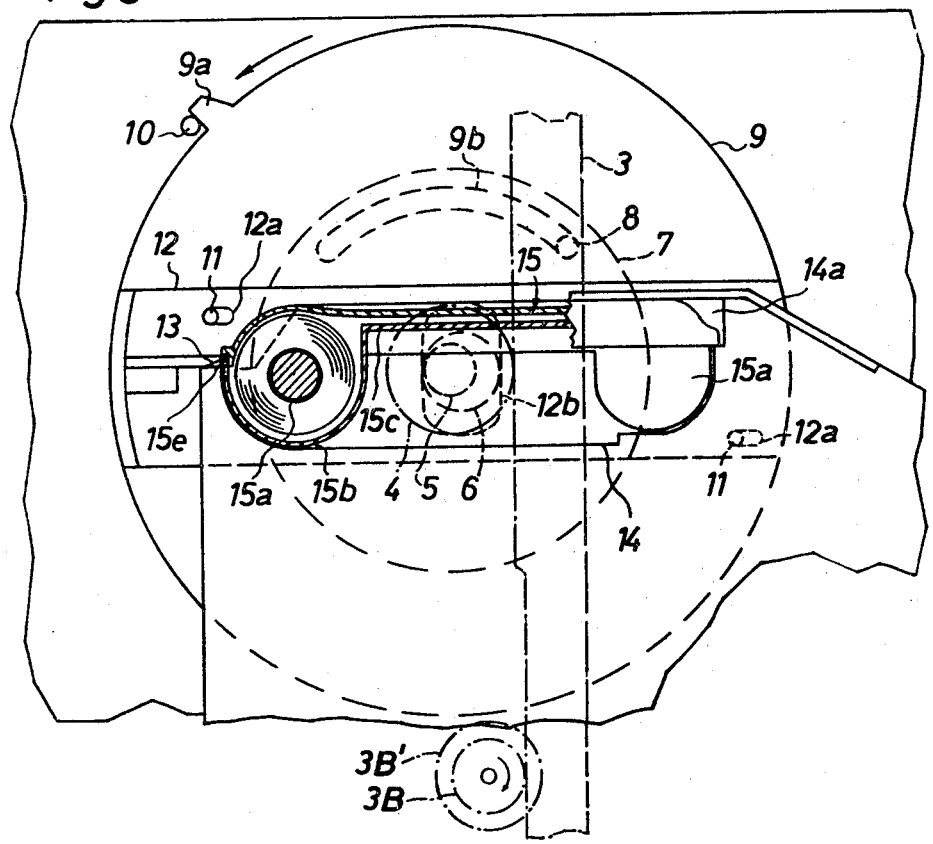
FIG. 3 is a similar front elevational view of the apparatus in an intermediate position subsequent to initial cracking of the housing.
Figures 4, 5:
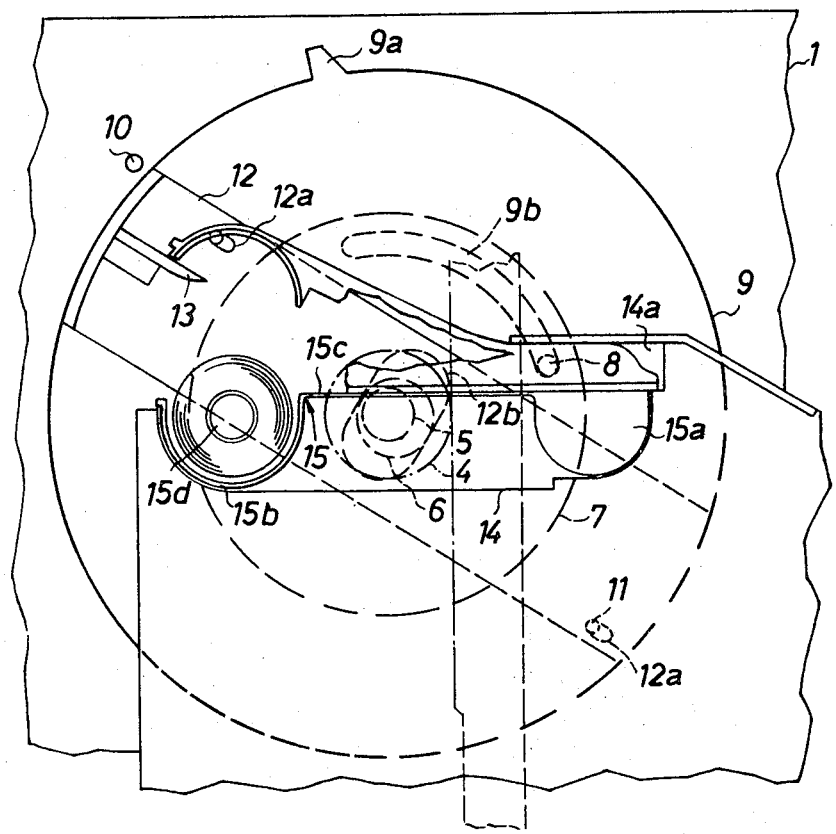
FIG. 4 is a similar fragmentary front elevational view of the apparatus in a further position upon completed opening of the housing.
FIG. 5 is an elevational view of the opened housing.

FIG. 3 shows schematically a second pinion 3B which meshes with the rack 3 and is driven by an electric motor 3B'. The parts 3B, 3B' replace the pedal 3b of FIG. 2. If desired, the apparatus can include a motor and a manually operated member for moving the rack 3.

It will be noted that the chisel 13 moves in a first direction during travel with the carriage 12 into engagement with the seam 15e, and that the chisel thereupon moves in a second direction (with the wheel 9) while its cutting portion remains in engagement with the seam 15e. It is equally within the purview of our invention to move the support 14 with reference to the chisel 13 so as to place the cutting edge of the chisel into engagement with the seam 15e or with another part of the housing of the cassette which is held in a predetermined position, and to thereupon move the chisel with reference to the support 14 or vice versa while the cutting edge remains in engagement with the seam. This would merely amount to a simple reversal of functions of the parts 13 and 14.

FIGS. 7 and 8 illustrate a second opening apparatus whose frame supports or includes an adjustable support or platform 21. This platform 21 can be provided with rubber legs (not shown) and rests on a work bench or table. It is also possible to secure the platform 21 to a bench by means of screws or analogous fasteners. Two vertical shafts 22, 23 which are mounted on and extend downwardly beyond the platform 21 serve as pivots for two clamping levers 24, 25 which are installed at the underside of the platform. The levers have projections 24a, 25a which are coupled to each other by a helical contraction spring 26. Two tracking pins or rolls 27, 28 which are respectively provided on the clamping levers 24, 25 extend upwardly through apertures or cutouts 21a, 21b in the platform 21 and serve to pivot the clamping levers away from each other against the opposition of the spring 26. The levers 24, 25 further comprise upwardly extending portions 24b, 25b which extend with clearance through apertures or cutouts 21c, 21d of the platform 21 and carry clamping arms 29, 30 located at a level above the platform. The arms 29, 30 respectively serve to reciprocate horizontal clamping bolts 31, 32 which are respectively guided in stationary bearing sleeves 37, 38. The free ends of the arms 29, 30 engage the respective clamping bolts 31, 32 between pairs of axially spaced diametrically extending pins 33, 34 and 35, 36 which permit limited pivotal movements of arms in response to pivoting of clamping levers 24, 25 on the shafts 22, 23. It will be seen that the arms 29, 30 cooperate with the pins 33-34 and 35-36 to convert pivotal movements of levers 24, 25 into reciprocatory movements of clamping bolts 31, 32. The arrangement is such that the inner ends of the bolts 31, 32 penetrate into the bore or hole of the reel 39d in the takeup portion 39b of a housing in a cassette 39 when the latter is properly mounted on the platform 21 in a predetermined position. Such cassette 39 then rests on the platform 21. The bearing sleeves 37, 38 are mounted in a two-piece bearing member 40 which is installed on the platform 21; this bearing member comprises two cheeks of sheet metal or the like. The bearing sleeves 37, 38 further serve as pivots for an actuating lever 41 which is provided with a lifting or pivoting portion 41c (see particularly FIG. 8) normally located at a level below the platform 21 and adapted to move upwardly through an aperture or cutout 21e so that it can engage the supply portion 39a or the intermediate part 39c of the cassette 39. In the apparatus of FIGS. 7 and 8, a counterclockwise pivotal movement of the actuating lever 41 through about 30° from the starting or idle position of FIG. 8 suffices to move the top edge of the portion 41c into engagement with the housing of a properly mounted and clamped cassette 39. The actuating lever 41 further comprises a U-shaped part having legs 41a, 41b provided with recesses registering with the cutouts 21a, 21b to permit pivotal movements of tracking rolls 27, 28. Furthermore, the legs 41a, 41b are respectively provided with circular openings for the bearing sleeves 37, 38. The distance between the legs 41a, 41b is selected in such a way that the actuating lever 41 (in its idle or starting position) permits insertion of a cassette 39.

The legs 41a, 41b of the actuating lever 41 are further provided or connected with motion transmitting cams 42, 43 which cooperate with follower arms 44 of a two-armed pivotable carriage 45 replacing the carriage 12 of FIGS. 1-6 and serving as a holder for a cassette opening tool or chisel 46. The carriage 45 is U-shaped and is pivotable with reference to the bearing member 40 about a shaft 47. When the carriage 45 is pivoted by cams 42, 43 in a counterclockwise direction, as viewed in FIG. 8, the edge of the chisel 46 engages the seam 39e of the housing of the cassette 39. The position of the shaft 47 is selected in such a way that a line connecting its axis with the edge of the chisel 46 makes with a line connecting the edge of the chisel with the axis of the reel 39d in takeup portion 39b of the cassette an oblique angle, i.e., an angle exceeding 90°. This can be readily seen in FIG. 8. The carriage 45 further supports a yieldable shield 50 which is pivotally secured thereto by two coaxial screws 48 and is biased by a helical spring 51 so that it bears against the housing of a properly inserted cassette 39. The shield 50 engages the reel 39d when the housing of the cassette 39 is removed. The spring 51 is connected between the bearing member 40 or another stationary part of the frame and the shield 50.

The operation of the opening apparatus shown in FIGS. 7 and 8 is as follows:

A fresh cassette 39 is introduced into the apparatus in such a way that the takeup portion 39b is located at its front end and that the cassette moves in a direction from the right to the left, as viewed in FIG. 7 or 8. During the initial stage of such introduction, the takeup portion 39b engages and moves the tracking rolls 27, 28 away from each other so that the spring 26 expands and the arms 29, 30 move the clamping bolts 31, 32 axially and away from each other. When the intermediate part 39c of the cassette moves into registry with the rolls 27, 28, the spring 26 is free to contract and pivots the arms 29, 30 to move the bolts 31, 32 toward each other whereby the inner ends of the bolts enter the axial bore in the reel 39d in the takeup portion 39b. The housing of the cassette 39 is then properly held and clamped in an optimum position for opening.

The operator then pivots the actuating lever 41 in a counterclockwise direction, as viewed in FIG. 8, so that the lever turns about the common axis of the bearing sleeves 37, 38 and clamping bolts 31, 32. During the initial stage of such pivotal movement of the actuating lever 41, the cams 42, 43 engage the followers 44 and pivot the carriage 45 in a counterclockwise direction, as viewed in FIG. 8, whereby the carriage causes the cutting edge of the chisel 46 to penetrate into the seam 39e of the housing. The arrangement is preferably such that the maximum penetration of the chisel 46 is somewhat less than the thickness of the adjoining portion of the housing of the cassette 39; however, such penetration suffices to produce a crack in the seam 39e. The operator continues to pivot the actuating lever 41 in a counterclockwise direction whereby the portion 41c of the actuating lever moves upward through the cutout 21e and engages the underside of the intermediate part 39c at a point which is remote from the common axis of the clamping bolts 31, 32. The supply portion 39a is thereby lifted off the platform 21 and pivots about the edge of the chisel 46. The latter prevents the upper part of the seam 39e from sharing such pivotal movement and causes the crack to propagate itself toward the portion 39a with simultaneous flexing and deformation of the broken-up intermediate part 39c. The lower half of the housing of the cassette 39 is stiffer so that the upper half of the intermediate part 39c undergoes much greater deformation and causes the housing to develop a progressively increasing gap between the halves of the broken seam 39e until the width of the gap reaches and exceeds the diameter of the reel 39d in the portion 39b. This normally takes place when the actuating lever 41 is turned through about 120° after its portion 41c engages the intermediate part 39c. The innate elasticity of the housing then causes the latter to detach itself from the reel 39d and to be ejected in a direction to the left, as viewed in FIG. 8. The lever 41 is then returned to starting position so that the reel 39d on the clamping bolts 31, 32 is readily accessible. The operator can grip the leader of the film on the reel 39d and can withdraw the film while the reel turns on the clamping bolts 31, 32. The spring 51 urges the shield 50 against the reel 39d on the bolts 31, 32 and the shield performs the additional function of preventing the leading end of the film from moving downwardly along the chisel 46 during removal of paper. Thus, the leading end of the film curls at a level above the edge of the chisel 46 and cannot be scratched or otherwise damaged. The shield 50 overlies the sharp edge of the chisel 46 and prevents injury to the operator.

When the film is withdrawn from the reel 39d which is held by the bolts 31, 32, the reel can be removed by moving the arms 29, 30 apart so that a fresh cassette 39 can be introduced in the aforedescribed manner. The empty reel 39d which is held by the bolts 31, 32 can be removed or falls out automatically during insertion of a fresh cassette 39, i.e., while the portion 39b of the housing of such fresh cassette engages the tracking rolls 27, 28 and pivots the arms 29, 30 to move the clamping bolts 31, 32 away from each other. A suitable receptacle can be provided to intercept the reel 39d which is released by the clamping bolts 31, 32. Such reel descends through an aperture or cutout 21f of the platform 21. Automatic ejection of the opened housing of a cassette 39 and of the empty reel 39d contributes significantly to a reduction of time which is needed to remove exposed film from successive cassettes. Empty housings which are ejected automatically in response to counterclockwise pivotal movement of the actuating lever 41 can be intercepted so that the identifying tabs 121 can be removed from intermediate parts 39c of empty housings and applied to leading ends of films on reels 39d which are still held by the clamping bolts 31, 32. It is also possible to install on the platform 21 a suitable splicer for automatically or manually uniting successive exposed films to form a long strip which is thereupon transported through a developing machine, not shown. It is equally within the purview of our invention to provide a motor which can pivot the actuating lever 41 to and from starting position. The dimensions of the lever 41 are then preferably reduced. If the means for driving the actuating lever 41 comprises an electric motor, the control panel with pushbuttons for starting the motor in forward or reverse can be installed on or adjacent to the platform 21. The operator then merely depresses the appropriate pushbutton to start the opening of the properly mounted housing of a cassette 39.

The opening apparatus of FIGS. 7 and 8 can be combined with a suitable applicator which can automatically or semiautomatically transfer identifying tabs onto the leading ends of successively removed exposed films. The identifying tabs preferably carry the customer numbers which are used for proper classification of prints and for sorting of such prints in corresponding envelopes for transport back to the customers. Each tab is coated with adhesive at one of its sides so that it can properly adhere to the leading end of an exposed film which is convoluted onto the reel 39d of the takeup portion 39b together with the customary paper strip. Since the apparatus of FIGS. 7 and 8 automatically ejects the broken housing of an opened cassette, it is not possible to transfer the identifying tabs directly from the intermediate parts 39c onto the leading ends of corresponding exposed films. Furthermore, it is to be borne in mind that the opening of housings of cassettes 39 takes place in absolute darkness so that it would be difficult to manually apply such tabs to the same portion of each successively freed film. An applicator which can be used to insure that each identifying tab is applied to the same part on the leading end of an exposed film which has been freed upon breaking of the corresponding housing is illustrated in FIGS. 9 and 10. The exposed film is shown at 52, and this film has the tendency to curl and to form convolutions 52b which are formed around a suitable yoke-like retaining member 53. One marginal portion of the film 52 is provided with equidistant perforations 52a the foremost one of which is engaged by a locating post 55 mounted on or integral with a base plate or support 54 which can form an extension of the platform 21. Upstanding guide pins or locating pins 56, 57 of circular cross section are provided on the support 54 to guide the adjoining edges of the film 52 when the latter is moved in a direction to the left, as viewed in FIG. 9. The operator stands or sits in front of the support 54, i.e., below the lower edge of the film 52, as viewed in FIG. 9. The film thus extends between the operator and two bearing members 58, 59 which are mounted on the support 54 and hold the ends of a pintle 60 for a carrier or flap 61. The axis of the pintle 60 is parallel to the longitudinal direction of the film 52, and the flap 61 has openings for the post 55 and guide pins 56, 57. Furthermore, the flap 61 has a handle 61a by means of which the operator can pivot the flap back and forth about the pintle 60. Still further, the flap 61 has a cutout 61b which is flanked by two edge faces making an angle of 90°, and one of these edge faces has a relatively narrow supporting ledge 61c which is parallel to the axis of the pintle 60. The width of the ledge 61c is a small fraction of an inch, for example, 2 millimeters.

The operation:

Before the housing of a fresh cassette 39 is inserted into the opening apparatus of FIGS. 7 and 8, the identifying tab 62 is removed from its intermediate part 39c and is attached to the ledge 61c of the applicator in a manner as shown in FIG. 9. The configuration of the cutout 61b in the flap 61 is such that its mutually inclined edges facilitate the application of tabs 62 in an optimum position for transfer onto the leading ends of corresponding films 52. Such attachment of a tab 62 to the ledge 61c can take place in any desired angular position of the flap 61. When the film 52 is removed from the reel 39d of a freshly opened cassette 39, its convolutions 52b are placed onto the retaining member 53 and the foremost perforation 52a is applied over the post 55 while the flap 61 is held in open or raised position. The pins 56, 57 then properly guide the adjoining edges of the leading end of film 52. The operator thereupon pivots the flap 61 about the axis of the pintle 60 so that the adhesive-coated side of the tab 62 on the ledge 61c moves toward and contacts a predetermined portion of the film 52. In other words, the position of the transferred tab 62 with reference to the foremost perforation 52a can be determined in advance and always with the same degree of accuracy, as long as the operator makes sure that the tab 62 is properly attached to the ledge 61c. FIG. 10 illustrates the flap 61 in a position when the adhesive-coated side of the tab 62 comes in contact with the adjoining portion on the leading end of the film 52.

Since the area of contact between a tab 62 and the ledge 61c is rather small, the tab can be automatically detached from the ledge when the flap 61 is pivoted away from the position shown in FIG. 10. If desired, the operator can apply slight finger pressure against the tab 62 when the latter adheres to the film 52 but before the flap 61 is moved away from the position shown in FIG. 10. Also, the operator can apply finger pressure to the tab after the flap 61 is moved away from the position of FIG. 10 to make sure that each part of the adhesive-coated surface on the tab 62 adheres to adjoining portion of the film 52. Such smoothing of the tab 62 is advisable to make sure that the tab retains its position during transport of the film 52 through winding, fixing, drying, automatic framing and copying stations. Therefore, films 52 which are provided with identifying tabs 62 in the applicator of FIGS. 9 and 10 can be safely treated in programmed developing and other film processing machines.

It is clear that the applicator of FIGS. 9 and 10 can be used with equal advantage for application of identifying tabs to films removed from cassettes which are opened in conventional opening apparatus, i.e., not necessarily in the apparatus shown in FIGS. 8 and 9. This applicator can also be used in combination with the opening apparatus of FIGS. 1 to 6.

One of the main differences between the opening apparatus of FIGS. 1 to 6 and 7-8 is that, in the apparatus of FIGS. 1 to 6, the cassette 15 remains in predetermined position with reference to the support 14 while the tool 13 moves with the wheel 9 subsequent to penetration of the cutting edge into the housing of the cassette. In the apparatus of FIGS. 7-8, the tool 46 is stationary after its cutting edge penetrates into the housing of the cassette 39, and the actuating lever 41 thereupon causes the housing of the cassette to move with reference to the tool.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. Apparatus for opening and marking the contents of film cassettes, particularly for opening and marking the contents of cassettes of the type having a plastic housing including takeup and supply portions connected by an intermediate part and wherein one of said portions contains a reel with convoluted film, comprising support means for supporting the housing of a cassette in a predetermined position, opening means comprising a tool having a cutting portion, and actuating means operative to effect a movement between the tool and said support means so that the cutting portion penetrates into and produces at least a crack in the housing which is held in said predetermined position; and applicator means having a movable portion which is actuatable to effect uniform application of discrete identifying markers having adhesive-coated sides to predetermined portions of films which are accessible upon opening of the respective housings, the adhesive-coated sides of such markers adhering to the respective housings at least prior to opening thereof and being detached from the housings and attached to said movable portion of said applicator means prior to actuation of said movable portion so that the entire marker overlies the predetermined portion of the respective film.

2. Apparatus as defined in claim 1, wherein said applicator means further comprises a support provided with locating means for positioning a film, said movable portion including carrier means which is movable with reference to said support between an open position and a closed position in which a preselected part of said carrier means is adjacent to a predetermined portion of a film which is positioned by said locating means so that a marker which has a minor portion of its adhesive-coated side separably attached to said preselected part can be transferred onto the predetermined portion of such film.

3. Apparatus as defined in claim 2, wherein said preselected part is a narrow ledge of said carrier means.

4. Apparatus as defined in claim 3, wherein said carrier means is provided with a cutout for markers and has an edge portion constituting said ledge and flanking said cutout.

5. A method of opening and marking the contents of film cassettes, particularly of opening and marking the contents of cassettes of the type having a plastic housing including takeup and supply portions connected by an intermediate part, wherein one of said portions contains a reel with convoluted film, and wherein the housing carries an identifying marker having an adhesive-coated side, comprising the steps of breaking open the housing of a cassette to gain access to the film therein; removing the marker from the housing not later than upon removal of the film therefrom; attaching a minor portion of the adhesive-coated side of the thus removed marker to a supporting surface; placing a predetermined portion of the removed film into a predetermined position relative to the supporting surface; moving the supporting surface with the marker thereon along a predetermined path to thereby attach the major portion of the adhesive-coated side of the marker to the predetermined portion of film occupying said predetermined position; and separating the supporting surface from said minor portion of the adhesive-coated side of the marker while the major portion of such adhesive-coated side continues to adhere to said predetermined portion of the film by moving the supporting surface relative to said predetermined portion of the film, the thus attached marker overlying in its entirety the predetermined portion of the film.

6. A method as defined in claim 5, further comprising the steps of applying pressure to the marker so as to place the entire adhesive-coated side thereof into contact with said predetermined portion of the film, and removing said predetermined portion of the film from said predetermined position.

* * * * *